(12) United States Patent
Benslimane et al.

(10) Patent No.: US 7,104,146 B2
(45) Date of Patent: Sep. 12, 2006

(54) POSITION SENSOR COMPRISING ELASTOMERIC MATERIAL

(75) Inventors: Mohamed Yahia Benslimane, Nordborg (DK); Peter Gravesen, Nordborg (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 10/499,413

(22) PCT Filed: Dec. 17, 2002

(86) PCT No.: PCT/DK02/00861

§ 371 (c)(1),
(2), (4) Date: Nov. 3, 2004

(87) PCT Pub. No.: WO03/056274

PCT Pub. Date: Jul. 10, 2003

(65) Prior Publication Data

US 2005/0044947 A1 Mar. 3, 2005

(30) Foreign Application Priority Data

Dec. 21, 2001 (DK) ............................... 2001 01934

(51) Int. Cl.
*G01L 1/14* (2006.01)
(52) U.S. Cl. ................................. 73/862.626
(58) Field of Classification Search ............. 73/504.12, 73/862.337, 862.26, 862.626
See application file for complete search history.

(56) References Cited

U.S. PATENT DOCUMENTS

| | | | |
|---|---|---|---|
| 3,753,294 A * | 8/1973 | Attali et al. ................... 33/735 |
| 4,386,386 A | 5/1983 | Akita | |
| 4,654,546 A | 3/1987 | Kirjavainen | |
| 5,060,527 A * | 10/1991 | Burgess ................... 73/862.68 |
| 5,090,248 A | 2/1992 | Cimmino et al. | |
| 5,115,680 A | 5/1992 | Lew | |
| 5,425,275 A | 6/1995 | Lockshaw | |
| 6,282,956 B1 * | 9/2001 | Okada ..................... 73/504.12 |
| 6,581,481 B1 * | 6/2003 | Perusek ................. 73/862.337 |
| 6,662,658 B1 * | 12/2003 | Foote ....................... 73/514.29 |
| 2004/0217671 A1 * | 11/2004 | Rosenthal et al. .......... 310/328 |

FOREIGN PATENT DOCUMENTS

| | | |
|---|---|---|
| EP | 0 387 180 A | 9/1990 |
| FR | 2 309 833 A | 11/1976 |
| WO | WO 00/66970 A | 11/2000 |

* cited by examiner

*Primary Examiner*—Edward Lefkowitz
(74) *Attorney, Agent, or Firm*—McCormick, Paulding & Huber LLP

(57) ABSTRACT

The present invention relates to transducers for converting the spatial position of an object into an electrical signal, more specific to a novel position sensor which has advantages of simplicity, long-term stability and durability. According to the invention, a position sensor comprises at least one body of an elastomeric material, mounting means for mounting a first part of the body to a support, and movable means joined to a second part of the body at a distance from the first part, the movable means being movable to stretch a third part of the body located between the mounting means and the movable means. The sensor has opposed first and second surfaces on the third part, a first electrode on the first surface, and a second electrode on the second surface.

9 Claims, 2 Drawing Sheets

POSITION SENSOR COMPRISING ELASTOMERIC MATERIAL

CROSS-REFERENCE TO RELATED APPLICATIONS

This application is entitled to the benefit of and incorporates by reference essential subject matter disclosed in International Application No. PCT/DK02/00861 filed on Dec. 17, 2002 and Danish Patent Application No. PA 2001 01934 filed on Dec. 21, 2001.

FIELD OF THE INVENTION

The present invention relates to transducers for converting the spatial position of an object into an electrical signal. Spatial position is typically measured in terms of the distance of an object from a reference point along three orthogonal coordinate directions, or in terms of the linear distance of the object from a reference point and two bearing angles relative to orthogonal planes intersecting at the reference point. In many applications one actually only needs to know the position of an object in one dimension. Thus there is clearly a need for a position sensor which is capable of measuring linear distance from a reference point.

BACKGROUND OF THE INVENTION

Depending on the range of distances involved, various different physical principles are employed for electrically or electronically measuring linear distance to an object. An example is the reflection of radio waves (RADAR) or light from objects at long ranges of a few hundred meters or more. Medium range position measurements down to maybe one meter can be made by reflection of ultrasound from the object, for example. Short-range measurements of distances below one meter employ a wide variety of inductive, capacitive and resistive distance transducers.

In short-range measurement of the position of an object it is typical for the object to carry an element which is part of a transducer arrangement, or to be physically connected with the transducer. For example, a reciprocating machine part may be connected to the slider of a linear potentiometer or carry an inductive coil which forms part of a moving-coil distance transducer.

It is an object of the present invention to provide a novel position sensor which has advantages of simplicity, long-term stability and durability.

SUMMARY OF THE INVENTION

According to the invention, a position sensor comprises at least one body of an elastomeric material, mounting means for mounting a first part of the body to a support, and movable means joined to a second part of the body at a distance from the first part, the movable means being movable to stretch a third part of the body located between the mounting means and the movable means. The sensor has opposed first and second surfaces on the third part, a first electrode on the first surface, and a second electrode on the second surface.

In use, the movable means serves as an attachment point to which an attachment is made from the object whose position or distance is to be measured. The object may be connected to the movable means directly or by means of a pulley, linkage or transmission, for example. As the object moves within the operating range of the sensor, the elastomeric body is stretched to varying degrees by the resulting movement of the movable means. Stretching the body will cause it to narrow, as anybody has experienced who has ever pulled at a rubber band. The narrowing of the body will reduce the distance between the electrodes on the body. If the electrodes are operated as the electrodes of a capacitor, the reduction in their separation will increase the capacitance of that capacitor. Thus, by measuring the electrode capacitance, an electronic measurement of the position of the movable means may be had, and in turn a measurement of the position of an object attached thereto.

The sensor of the invention may be employed in a push-pull fashion which enhances its operating characteristics. To this end, the body is provided with a second mounting means for mounting a fourth part of the body to a support with the movable means being positioned between the first mounting means and the second mounting means. Opposed third and fourth surfaces are provided on a fifth part of the body located between the movable means and the second mounting means. A third electrode is provided on the third surface and a fourth electrode is provided on the fourth surface. In this embodiment, the movable means is movable to stretch the fifth part while reducing the degree of stretching of the third part, and to stretch the third part while reducing the degree of stretching of the fifth part.

As a result of this, movement of the movable means away from the first mounting means will increase the capacitance of the capacitor formed by the first and second electrodes and decrease the capacitance of the capacitor formed by the third and fourth electrodes. This behaviour may be employed, for example, in a half-bridge capacitance measuring circuit to develop a position measurement with increased linearity and resolution.

In an obvious variation of the push-pull principle, two separate elastomeric bodies may be employed which are connected head to head by one common movable means.

BRIEF DESCRIPTION OF THE DRAWINGS

Preferred embodiments of the invention will now be described with reference to the accompanying drawings.

DETAILED DESCRIPTION OF THE PREFERRED EMBODIMENTS

Figure 1:
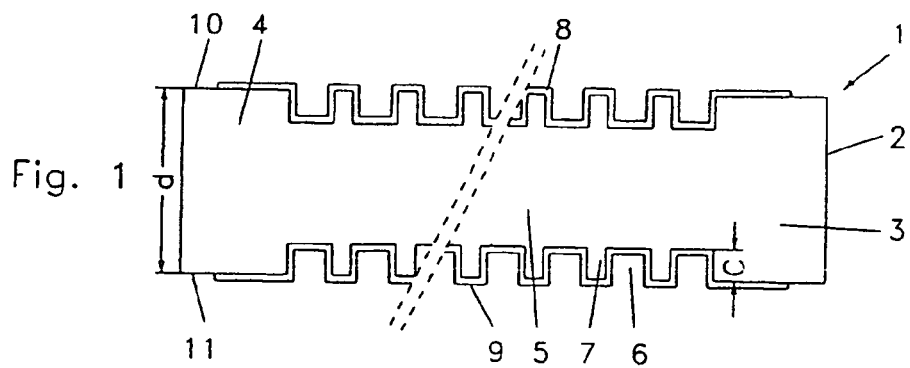
FIG. 1 is a side view of an elastomeric sheet having electrodes on opposing corrugated surfaces.

FIG. 1 is a side view of an elastomeric sensor member 1 cast from a silicone rubber compound. The sensor member has a body 2 formed as a sheet having a thickness d of 10–50 micrometers. The body has two end-parts 3 and 4 and an intermediate part 5 connecting the end-parts. The upper and lower surfaces 10 and 11 of the sheet 2 are corrugated with grooves 6 and ridges 7 running across the width of the sheet. The peak-to-peak dimension c of the corrugations is typically 10–20% of the thickness d of the sheet. For example the sheet may be 20 micrometers thick and the corrugations may have a peak-to-peak dimension of 4 micrometers.

The intermediate part 5 of the body 2 is covered with electrodes 8 and 9 on both surfaces. The electrodes extend onto the end parts 3 and 4 of the body. They may be formed from silver, copper or other suitable metal or conducting material by vapor deposition or electrolytic methods, for example. The electrodes typically have a thickness of about 20–100 nanometers.

Figure 2:
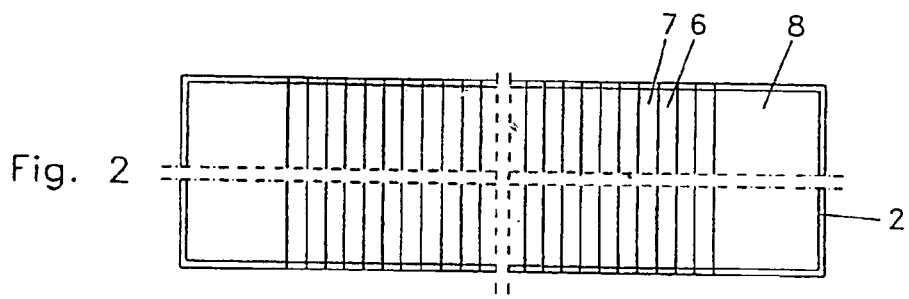
FIG. 2 is a view from the top of the same sheet.

FIG. 2 is a top view of the elastomeric sheet of FIG. 1. In a presently preferred embodiment, the sheet 2 has an overall length of 2–4 centimeters and a width of 0.5 to 2 centimeters. It is clear from these dimensions that FIG. 2 is not shown to scale and that the dimensions of the grooves 6 and ridges 7 of the corrugation have been grossly exaggerated. FIG. 2 shows the corrugations running in parallel with the transverse or width dimension of the sheet 2.

Figure 3:
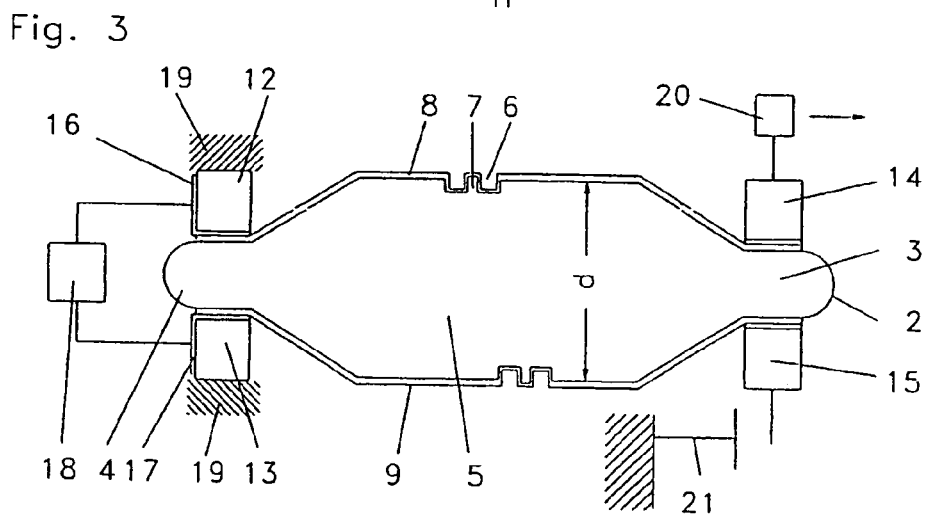
FIG. 3 is a schematic illustration of a position sensor employing a single elastomeric sheet as shown in FIG. 1, in a state where it is near one endpoint of its sensing range.

FIG. 3 shows the employment of the elastomeric sensor member of FIGS. 1 and 2 in a position sensor. The illustration has been simplified by leaving out most of the corrugations 6, 7. The end part 4 of the elastomeric body or sheet 2 is clamped between small beams 12, 13 of an insulating material such as a clear acrylic known as Plexiglas. Electrical contact to the electrodes 8, 9 has been provided by the interposition of metal foils 16, 17 of copper, aluminum or other suitable metal between the beams 12, 13 and the electrodes. The metal foils 16, 17 are exposed on the beams to allow electrical connection of the electrodes to a capacitance measuring circuit 18. The circuit 18 measures and indicates the electrical capacitance of the capacitor formed by the electrodes 8 and 9 and the intermediate part 5 of the sheet 2, which serves as a dielectric.

The clamping mechanism, which is not shown in FIG. 3, can be a bracket or other fastener arrangement holding the beams 12, and 13 together and connecting the beams with a stationary support 19. As can be seen from the Figure, the clamping force leads to a compression of the end part 4 relative to the intermediate part 5 of the sheet 2.

The other end part 3 is clamped between similar beams 14, 15 without any provision for electrical contact. The clamping arrangement at the end 3 is movable as a whole, since the beams 14 and 15 are not connected to the stationary support 19. As shown, the beam 14 is connected with a movable object 20 whose position is to be measured.

Also shown in FIG. 3 is a stationary travel limiter 21 limiting any movement of the movable end 3 towards the stationary end 4 of the sensor arrangement. The limiter 21 is positioned so that the intermediate part 5 of the sheet 2 is in a very slightly stretched state when the beam 15 abuts the limiter 21.

Figure 4:
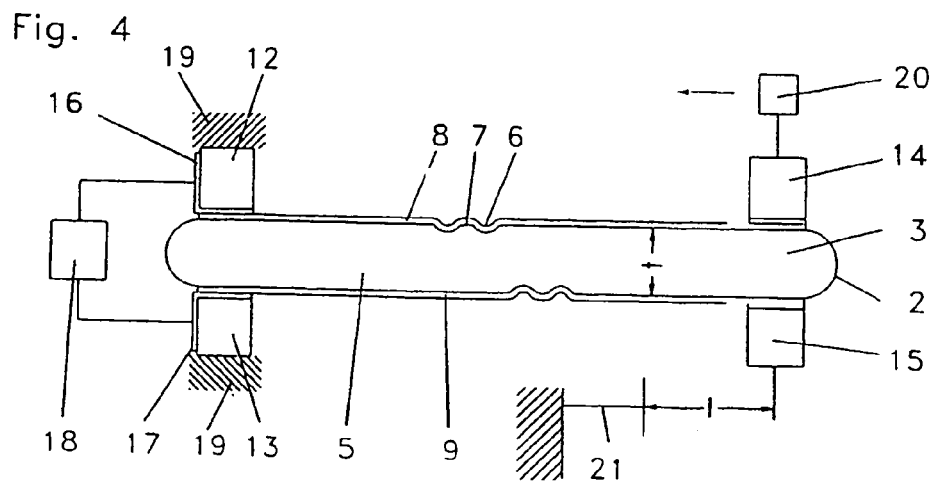
FIG. 4 is a schematic illustration of the position sensor of FIG. 3 in a state where it is at the opposite endpoint of its sensing range.

In FIG. 3, the movable object 20 is free to move towards the right side of the figure. As the object moves, it will stretch the intermediate part 5 of the elastomeric sheet 2 because of the pulling action of the clamping arrangement 14, 15 at the end 4 of the sheet, to which the object 20 is connected. FIG. 4 shows, in an exaggerated fashion for clarity, and end position of the object 20. The intermediate part 5 of the sheet has been stretched very strongly which has caused a reduction of its thickness to the value t, which is significantly lower than its thickness d in the quiescent state of the sensor arrangement.

The reduction in thickness of the sheet part 5 causes an increase in the capacitance of the capacitor formed by the electrodes 8 and 9, as they are brought more closely together. This increase is measured and indicated by the circuit 18. It has been found that the increase in capacitance is an accurate measure of the distance that the movable object 20 has traveled away from the limiter 21. Thus, the arrangement of FIGS. 3 and 4 is an accurate position transducer for the position of the movable object 21 relative to the limiter 21.

Figure 5:
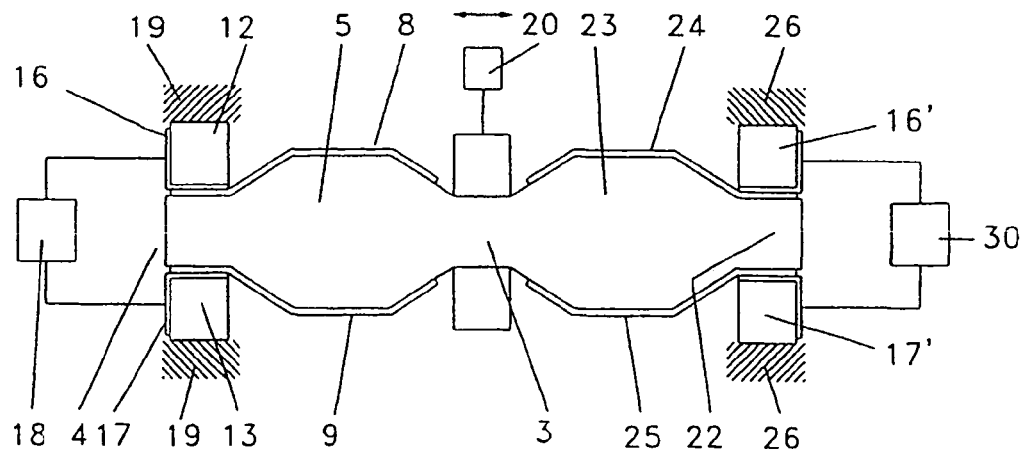
FIG. 5 is a schematic illustration of a push-pull position sensor employing a similar elastomeric sheet with two active parts, at its natural zero point position.

FIG. 5 shows an arrangement wherein a similar elastomeric sheet 2 has three clamped parts 3, 4 and 22 and two intermediate parts 5 and 23 between the clamped parts. The intermediate parts are similarly corrugated and provided with electrodes 8, 9 and 24, 25. The clamping arrangements at the end parts 4 and 23 are stationary with the supports 19 and 26 and provide for separate electrical contact to the electrode pairs 8, 9 and 24, 25, respectively. The clamping arrangement at the center part 3 is mobile and connected to the object 21 whose position is to be measured.

In the sensor of FIG. 5, the distance between supports 19 and 26 is chosen such that both intermediate parts 5 and 23 of the sheet 2 are stretched about half of their full stretching capacity when no external force acts on the center part 3. This is the situation illustrated. The movable object 20 is free to travel in both directions from the natural zero point of the sensing arrangement, which is at the position when both intermediate parts 5 and 23 are equally stretched.

Figure 6:
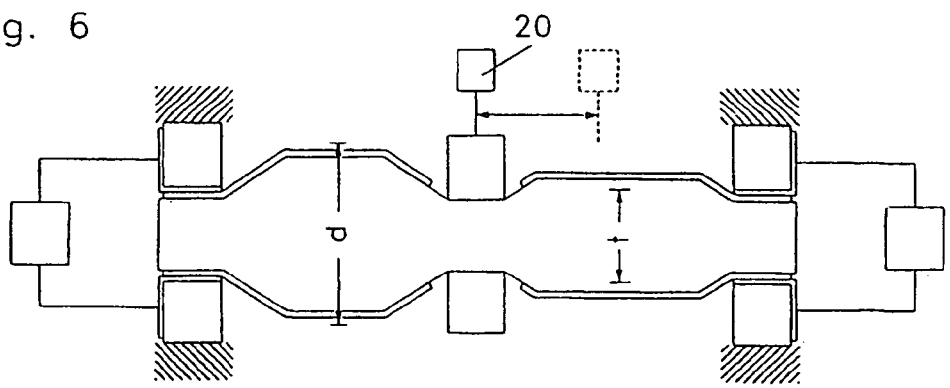
FIG. 6 is a schematic illustration of the position sensor of FIG. 5 at one end of its sensing range.

FIG. 6 shows a situation in which the movable object has travelled over almost the full range of the sensor to the left. The left intermediate part 5 of the sheet 2 has now been relaxed so that it is only very slightly stretched while the right intermediate part 23 of the sheet 2 has been stretched almost to its full capacity. As a result, the left part 5 has returned almost to its casting thickness d while the right part 23 has been reduced in thickness almost to its minimum value t. The measuring circuit 18 detects this as a reduction in capacitance of the capacitor formed by the electrodes 8 and 9 while the measuring circuit 30 detects an increase in capacitance of the capacitor formed by the electrodes 24 and 25.

Through suitable combination of the signals from both measuring circuits, a signal can be developed which is an accurate measure of the position of the movable object 20 relative to the center of the sensor arrangement.

Figure 7:
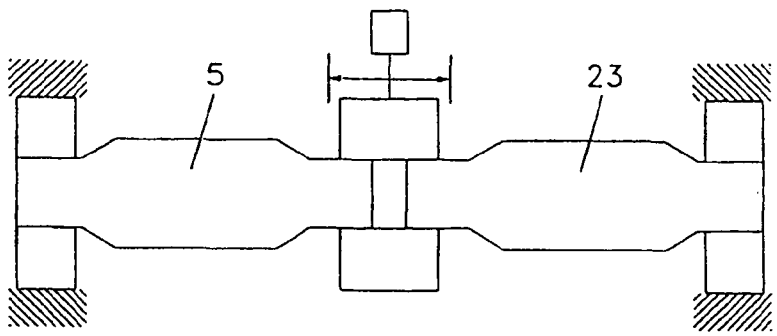
FIG. 7 is a schematic illustration of a push-pull position sensor employing two elastomeric sheets of the type shown in FIG. 1.

As shown in FIG. 7, a push-pull sensor can be constructed from two individual sensors by connecting them head-to-head.

Figure 8:
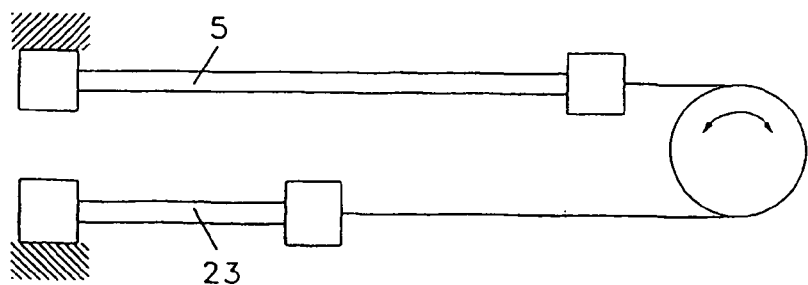
FIG. 8 is an illustration, more simplified than FIGS. 1 to 7, of a rotational position sensor employing the push-pull principle and a pulley.

As shown in FIG. 8, the push-pull principle lends itself readily to the construction of a rotary position transducer through the use of a pulley system. A single-ended transducer could be employed in a similar fashion, of course.

One of the key advantages of this transducer system over potentiometers is its freedom from abrasion, contact wear and contact noise. An inherent feature of the transducer system, which should be mentioned, is the existence of a restoring force. The elastomeric body will always tend to contract to its original shape. This causes a permanent force load on the object whose position is measured, tending to take it back to the zero-point position. The force may be rather small, as can be inferred from the typical dimensioning of the elastomeric body as explained above, but they will be present nonetheless and may make this sensor unsuitable for some applications.

The surface corrugation renders the elastomeric body highly anisotropic in its mechanical properties. It stretches very easily but only narrows very little because the corrugations make it far less compliant in the transverse direction than along its length. Therefore, the increase in length by stretching is converted almost exclusively into a reduction in thickness. This leads to good linearity of the device which is even increased by the greater range and resolution of the push-pull arrangement. It should be noted, however, that other configurations would also work in which the electrodes are arranged in a pattern on a flat surface, to render it stretchable. The pattern can be a meandering pattern or the pattern of a net, for example.

The invention of claimed is:

1. A position sensor comprising:
    at least one body of an elastomeric material in the form of a sheet;
    mounting means for mounting a first part of the body to a support;
    movable means joined to a second part of the body at a distance from the first part, the movable means being movable to stretch a third part of the body located between the mounting means and the movable means;
    opposed first and second outer surfaces provided on the third part;
    a first electrode formed on the first surface; and
    a second electrode formed on the second surface.

2. The position sensor as in claim 1, further comprising:
    second mounting means for mounting a fourth part of the body to a support with the movable means being positioned between the first mounting means and the second mounting means;
    opposed third and fourth outer surfaces on a fifth part of the body located between the movable means and the second mounting means;
    a third electrode on the third surface; and
    a fourth electrode on the fourth surface;
    wherein the movable means is movable to stretch the fifth part while reducing the degree of stretching of the third part, and to stretch the third part while reducing the degree of stretching of the fifth part.

3. A position sensor as in claim 1, wherein the first and second surfaces are corrugated.

4. The position sensor as in claim 1, wherein the electrodes are patterned to facilitate stretching of the third part.

5. The position sensor as in claim 2, wherein the first, second, third and fourth surfaces are corrugated.

6. The position sensor as in claim 2, wherein the electrodes are patterned to facilitate stretching of the third and fifth part.

7. A position sensor system, comprising two position sensors, each position sensor including:
    at least one body of an elastomeric material in the form of a sheet;
    mounting means for mounting a first part of the body to a support;
    movable means joined to a second part of the body at a distance from the first part, the movable means being movable to stretch a third part of the body located between the mounting means and the movable means;
    opposed first and second outer surfaces provided on the third part;
    a first electrode formed on the first surface; and
    a second electrode formed on the second surface.

8. The position sensor as in claim 7, wherein the first and second surfaces are corrugated.

9. The position sensor as in claim 7, wherein the electrodes are patterned to facilitate stretching of the third part.

* * * * *